United States Patent
Dropps et al.

(10) Patent No.: US 8,391,300 B1
(45) Date of Patent: Mar. 5, 2013

(54) CONFIGURABLE SWITCH ELEMENT AND METHODS THEREOF

(75) Inventors: Frank R. Dropps, Maple Grove, MN (US); Gary M. Papenfuss, St. Paul, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 876 days.

(21) Appl. No.: 12/539,156

(22) Filed: Aug. 11, 2009

Related U.S. Application Data

(60) Provisional application No. 61/088,281, filed on Aug. 12, 2008.

(51) Int. Cl.
*H04L 12/28* (2006.01)
*H04L 12/66* (2006.01)
*G06F 15/16* (2006.01)

(52) U.S. Cl. ......... 370/401; 370/351; 370/463; 709/231

(58) Field of Classification Search .......... 370/238–254, 370/389–392, 401–463, 463–469; 709/224–230, 709/250–326
See application file for complete search history.

(56) References Cited

U.S. PATENT DOCUMENTS

| | | | |
|---|---|---|---|
| 6,470,397 B1 * | 10/2002 | Shah et al. | 709/250 |
| 6,509,988 B1 * | 1/2003 | Saito | 398/47 |
| 7,035,228 B2 * | 4/2006 | Baumer | 370/258 |
| 7,397,788 B2 * | 7/2008 | Mies et al. | 370/351 |
| 7,558,281 B2 * | 7/2009 | Dropps et al. | 370/422 |
| 7,720,064 B1 * | 5/2010 | Rohde | 370/389 |
| 7,908,404 B1 * | 3/2011 | Lok et al. | 710/5 |
| 8,200,473 B1 * | 6/2012 | Dropps et al. | 703/21 |
| 2003/0091062 A1 * | 5/2003 | Lay et al. | 370/463 |
| 2003/0120791 A1 * | 6/2003 | Weber et al. | 709/231 |
| 2006/0064531 A1 * | 3/2006 | Alston et al. | 710/308 |
| 2008/0028096 A1 * | 1/2008 | Henderson et al. | 709/236 |
| 2009/0052461 A1 * | 2/2009 | Brown et al. | 370/401 |

* cited by examiner

*Primary Examiner* — Man Phan
(74) *Attorney, Agent, or Firm* — Klein, O'Neill & Singh, LLP

(57) ABSTRACT

A switching element and methods thereof are provided. The switching element includes a port from among a plurality of ports, which when configured to operate as a network protocol port sends and receives network information and when configured to operate as a storage protocol port sends and receives storage information. The port includes a control segment for generating a control signal for setting an operating mode of a serial and de-serializer (SERDES). The operating mode of the SERDES is selected based on whether the port is configured to operate as a network protocol port or as a storage protocol port.

20 Claims, 9 Drawing Sheets

CONFIGURABLE SWITCH ELEMENT AND METHODS THEREOF

CROSS REFERENCE TO RELATED APPLICATION

This application claims priority under 35 USC §119(e) to US provisional patent application, entitled "SWITCH PORT AUTO-CONFIGURATION", Ser. No. 61/088,281, filed on Aug. 12, 2008; the disclosure of which is incorporated herein in it entirety.

BACKGROUND

The present disclosure relates to networks.

Networking systems are commonly used to move network information (may also be referred to interchangeably, as frames, packets, commands or others) between computing systems (for example, servers) or between computing systems and network devices (for example, storage systems). Various hardware and software components are used to implement network communication. Different network and storage protocols may be used to handle network information and storage information. Continuous efforts are being made to enhance the use of networking and storage protocols.

SUMMARY

In one embodiment, a switching element is provided. The switching element includes a port from among a plurality of ports, which when configured to operate as a network protocol port sends and receives network information and when configured to operate as a storage protocol port sends and receives storage information.

The port includes a control segment for generating a control signal for setting an operating mode of a serial and de-serializer (SERDES). The operating mode of the SERDES is selected based on whether the port is configured to operate as a network protocol port or as a storage protocol port.

The port also includes a storage module at a receive segment of the port for receiving and processing the storage information when the port is configured to operate as a storage protocol port; and a network module at the receive segment for receiving and processing the network information, when the port is configured to operate as a network protocol port.

In another embodiment, a network system is provided. The system includes a computing system interfacing with a converged network adapter (CNA); and a switch element interfacing with the CNA, a storage system and a network device.

The switch element includes a plurality of ports, where a port from among the plurality of ports when configured to operate as a network port sends and receives network information and when configured to operate as a storage port sends and receives storage information.

The port includes a control segment for generating a control signal for setting an operating mode of a serial and de-serializer (SERDES). The operating mode of the SERDES is selected based on whether the port is configured to operate as a network protocol port or as a storage protocol port.

The port also includes a storage module at a receive segment of the port for receiving and processing the storage information when the port is configured to operate as a storage protocol port; and a network module at the receive segment for receiving and processing the network information, when the port is configured to operate as a network protocol port.

The port further includes a transmit segment having a transmit bypass module for processing network information, when the port is configured to operate as a network protocol port and a transmit storage module for processing storage information, when the port is configured to operate as a storage protocol port.

In yet another embodiment, a switch element having a plurality of ports is provided. A port from among the plurality of ports when configured to operate as an Ethernet port sends and receives network information and when configured to operate as a Fibre Channel port sends and receives storage information.

The port includes a control segment for generating a control signal for setting an operating mode of a serial and de-serializer (SERDES). The operating mode of the SERDES is selected based on whether the port is configured to operate as an Ethernet port or as a Fibre Channel port.

The port also includes a storage module at a receive segment of the port for receiving and processing the storage information when the port is configured to operate as a Fibre Channel port.

The port further includes a network module at the receive segment for receiving and processing the network information, when the port is configured to operate as an Ethernet port; and a transmit segment having a transmit network module for processing network information, when the port is configured to operate as an Ethernet port and a transmit storage module for processing storage information, when the port is configured to operate as a Fibre Channel port.

This brief summary has been provided so that the nature of the disclosure may be understood quickly. A more complete understanding of the disclosure can be obtained by reference to the following detailed description of the preferred embodiments thereof concerning the attached drawings.

BRIEF DESCRIPTION OF THE DRAWINGS

The foregoing features and other features of the present disclosure will now be described with reference to the drawings of the various embodiments. In the drawings, the same components have the same reference numerals. The illustrated embodiments are intended to illustrate, but not to limit the disclosure. The drawings include the following Figures.

DETAILED DESCRIPTION

Figure 1A:
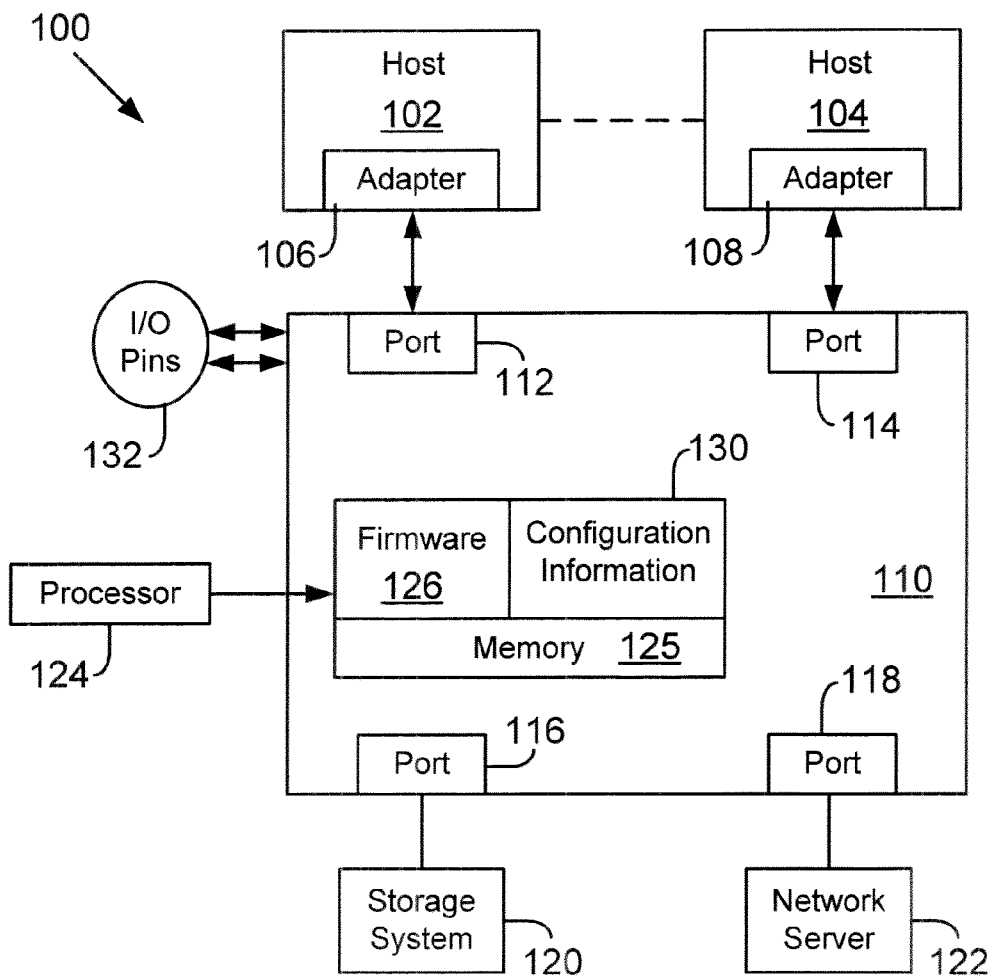
FIG. 1A shows a block diagram of a network/storage system, used according to one embodiment.

To facilitate an understanding of the various embodiments, the general architecture and operation of network and storage protocols will first be described.

The specific architecture and operation of the various embodiments will then be described with reference to the general architecture.

Network Protocols:

Various network protocols are used today for sending and receiving network information. One common network protocol is Ethernet. Ethernet is a family of frame-based computer networking technologies for local area networks (LANs). The Ethernet protocol defines a number of wiring and signaling standards for the Physical Layer of the Open System Interconnect Reference Model (or the OSI networking model), through means of network access at the Media Access Control (MAC)/Data Link layer, and a common addressing format.

The original Ethernet bus or star topology was developed for local area networks (LAN) to transfer data at 10 Mbps (mega bits per second). Newer Ethernet standards (for example, Fast Ethernet (100 Base-T) and Gigabit Ethernet) support data transfer rates between 100 Mbps and 10 gigabit (Gb). The description of the various embodiments described herein are based on using Ethernet (which includes 100 Base-T and/or Gigabit Ethernet) as the network protocol, however, the adaptive embodiments disclosed herein are not limited to any particular network protocol, as long as the functional goals are met by an existing or new network protocol.

Storage Protocol:

One common storage protocol used in storage area networks is Fibre Channel. Fibre Channel supports three different topologies, point-to-point, arbitrated loop and Fabric. The point-to-point topology attaches two devices directly. The arbitrated loop topology attaches devices in a loop. The Fibre Channel Fabric topology attaches host systems directly to a Fabric, which are then connected to multiple devices. The Fibre Channel Fabric topology allows several media types to be interconnected.

A Fibre Channel switch is a multi-port device where each port manages a point-to-point connection between itself and its attached system. Each port can be attached to a server, peripheral, I/O subsystem, bridge, hub, router, or even another switch. A switch receives messages from one port and routes it to another port.

Fibre Channel switches use memory buffers to hold frames received and sent across a network. Associated with these buffers are credits, which are the number of frames that a buffer can hold per Fabric port.

Although the description herein is based on Fibre Channel as the storage protocol, the adaptive aspects are not limited to Fibre Channel. Other similar protocols, for example, Infiniband, may be used to implement the adaptive embodiments disclosed herein.

Converged Network and Storage Protocol:

Continuous efforts are being made to develop converged protocols that can process both network and storage information. One such developing standard is Fibre Channel Over Ethernet (FCoE). This standard is being developed so that network adapters are able to handle both network and storage traffic.

The embodiments described herein reference various industry standards/protocols. These industry standards/protocols are meant to be examples of the broader concepts articulated in the appended claims.

As used in this disclosure, the terms "component", "module", "system," and the like are intended to refer to a computer-related entity, either software-executing general purpose processor, hardware, firmware or a combination thereof. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). Computer executable components can be stored, for example, on computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

System:

FIG. 1A shows a block diagram of a system 100 using a switch 110, according to one embodiment. System 100 includes a plurality of computing systems (or devices) (may also be referred to as host systems) 102, 104 that are coupled to switch 110 via adapters 106 and 108, respectively.

Adapter 106 and 108 may be converged adapters that can handle both network and storage traffic, for example, Ethernet and Fibre Channel based traffic. In one embodiment, adapter 106 and adapter 108 support the Fibre Channel Over Ethernet (FCoE) standard to process both Ethernet (network) and Fibre Channel (storage) traffic. One such adapter is provided by Qlogic Corporation, the assignee of this application.

Switch 110 may be coupled to a storage system 120 and a network server 122. Network server 122 sends and receives network traffic. Storage system 120 sends and receives storage data to and from host 102 and 104.

Switch 110 includes a plurality of ports, for example, ports 112, 114, 116 and 118. The term "port" as used herein includes logic, code and a combination thereof for processing information.

In conventional switches, ports are dedicated, i.e. they either operate as a network port (for example, as an Ethernet Port) or as a storage port (for example, Fibre-Channel port). This is commercially undesirable because a switch user may want the option to configure the switch ports based on user needs. For example, one may want to operate a port as a Fibre Channel port or as a pass through Ethernet Port.

The present embodiments provide options for configuring a switch port to operate both as a Fibre Channel port and as an Ethernet port. The same port can hence be used for both network and storage applications.

Switch 110 includes processor 124 for executing programmable instructions 126 (referred to as firmware instructions) out of memory 125 for controlling overall switch 110 operations. Memory 125 may also store configuration information 130 regarding ports 112, 114, 116 and 118 that may be used to configure one or more operating mode for the port, as described below in more detail.

Configuration information 130 may be stored in memory 125 or may be received from an external source (not shown) via input/output pins 132. I/O pins 132 may be used to receive configuration information from an external computing system/device (not shown).

Figure 1B:
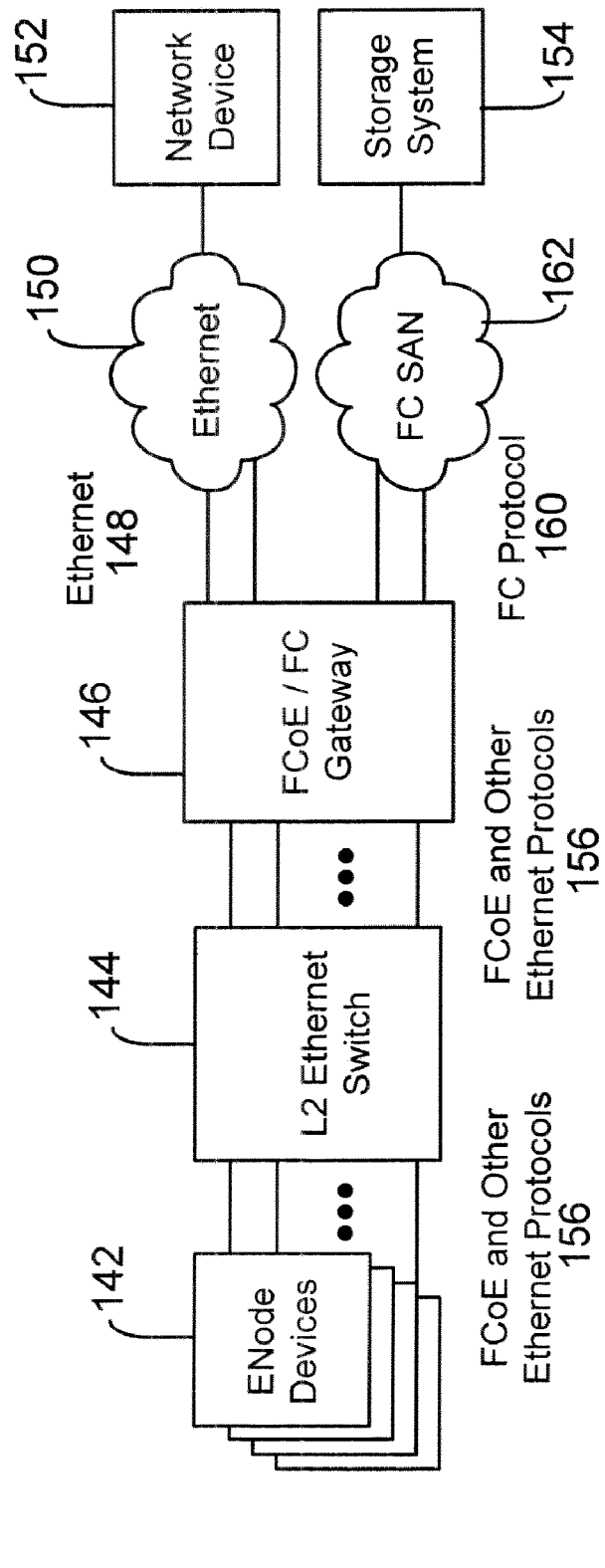
FIG. 1B shows another block diagram of network/storage system, used according to one embodiment.

FIG. 1B shows a block diagram of another system 140 using the adaptive embodiments disclosed herein. System 140 includes a plurality of end nodes 142 (similar to host system 102 with an FCoE adapter 106, FIG. 6) that are coupled to a network switch 144, for example, an Ethernet switch 144 that can route network traffic to and from end nodes 142. Switch 144 is operationally coupled to an FCoE/FC gateway 146.

Gateway 146 may communicate with network device 152 via network or fabric 150 using a network protocol (for example, Ethernet 148). The network or fabric may be an Ethernet network 150. Gateway 146 using a storage protocol (for example, FC 160) may also communicate with a storage system 154 attached to a storage area network 162. The network 162 may be a Fibre Channel SAN.

Computing System:

FIG. 10 shows a high level block diagram of computing system 102, which typically includes several functional components. These components may include a central processing unit (CPU) 164, host memory (or main/system memory) 166, storage device 168, adapter interface 172, and other devices 174, including input/output ("I/O") devices (not shown) and read only memory (not shown).

Host memory 166 is coupled to CPU 164 via a system bus or a local memory bus 170. Host memory 166 is used to provide CPU 164 access to data and program information that is stored in host memory 166 at execution time. Typically, host memory 166 is composed of random access memory (RAM) circuits. A computing system with the CPU and main memory is often referred to as a host system.

Adapter 106 can operate both as an initiator and a target (i.e. can be used on a host bus adapter or with a redundant array of inexpensive disks ("RAID") controller). Adapter 106 may be on a PCI development board with a Field Programmable gate Array ("FPGA"). The chip may also be integrated into an Application Specific Integrated Circuit ("ASIC") with an embedded serialize/de-serializer ("SERDES") (not shown) and internal programmable random access memory ("RAM").

Figure 2A:
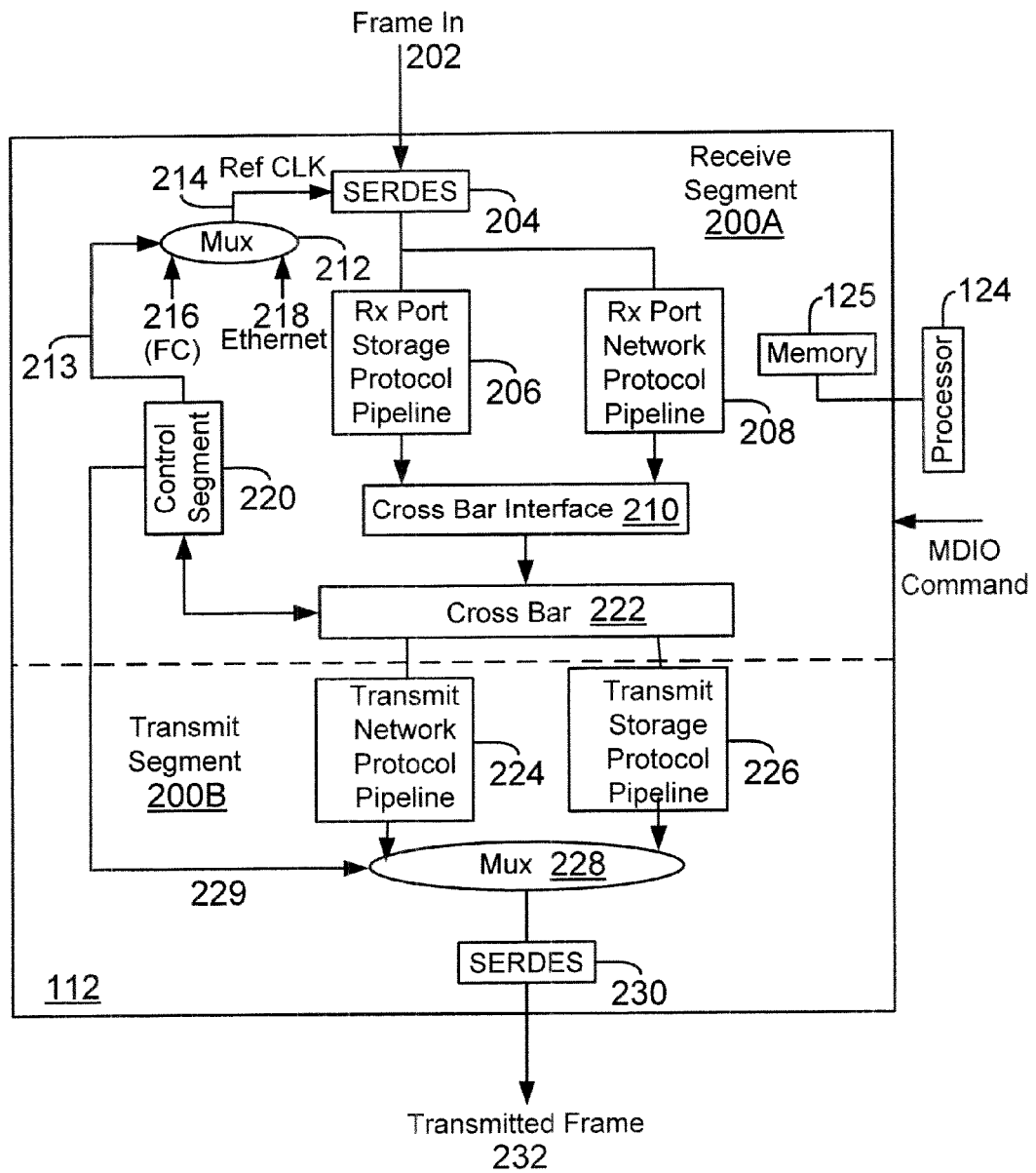
FIG. 2A shows a block diagram of a switch port, according to one embodiment.

Port 112:

FIG. 2A shows a block diagram of port 112 with a receive segment 200A and a transmit segment 200B. Receive segment 200A receives a frame (packet or information, used interchangeably) 202. Frame 202 may be a network frame or a storage packet and is processed depending on whether port 112 is operating in a storage mode (for example, in a Fibre Channel Mode) or a network mode (for'example, in an Ethernet Mode).

Frame 202 is received by a SERDES (serial/de-serializer) 204. SERDES 204 serializes and de-serializes information. SERDES 204 is configured to operate in either a storage mode (for example, a Fibre Channel mode operating as a standard Fibre Channel port) or in a network mode (for example, as a pass through Ethernet port).

SERDES 204 operating mode may be based on a reference clock 214 selected by a multiplexer ("Mux") 212 based on a plurality of inputs. For example, Mux 212 may receive two or more input clock signals 216 and 218. Input clock signal 216 may be used to select a storage operating mode, for example, a Fibre Channel mode to operate port 112 as a Fibre Channel port. Input clock signal 218 may be used to select a network operating mode, for example, Ethernet operating mode when port 112 operates as an Ethernet port. It is noteworthy that Mux 212 may receive more than two inputs to configure port 112 operate modes.

One of the input clock signals 216 and 218 is selected based on a control signal 213 that is generated by a control segment 220. Control segment 220 may be programmed by a user to change the port operating configuration, based on user needs.

It is noteworthy that Mux 212 may be located within SERDES 204 along with multiple phase lock loops to generated clock signals 216 and 218 from a common reference signal.

When port 112 operates in a storage mode, for example, as a Fibre Channel port, storage traffic goes through a Storage Protocol Pipeline 206 (shown as Rx Port Storage Protocol Pipeline and also referred to as "storage module" or "storage pipeline"). When operating in a non-storage mode, for example, as a network port, network traffic goes through Network Protocol Pipeline 208 (shown as RX Port Network Protocol Pipeline and may also be referred to as "network module" or "bypass pipeline"). The term Rx Port here simply means the receive segment 200A.

After incoming network or storage frames (for example, 202) have been processed by pipelines 206 and/or 208, the frames are sent to the transmit segment 200B via a crossbar interface 210 and crossbar 222. Crossbar interface 210 interfaces between crossbar 222, the storage pipeline 206 and the bypass pipeline 208. Crossbar interface 210 is used for making any adjustments that may be needed when transmitting network and storage frames.

The transmit segment 200B processes outgoing network and storage traffic using a Transmit Network Protocol Pipeline 224 and a Transmit Storage Protocol Pipeline 226. If outgoing traffic is storage traffic, then it is processed by the Transmit Storage Protocol Pipeline 226. Transmit Storage Protocol Pipeline 226 is designed to handle storage protocol related traffic. Non-storage traffic (for example, network traffic) is processed by Transmit Network Protocol Pipeline 224.

Transmit traffic via crossbar 222 is sent to SERDES 230 via Mux 228. Control signal 229 is sent to Mux 228 to select information from either transmit bypass pipeline 224 or transmit storage pipeline 226. Based on the selection, transmit traffic 232 is sent to its destination.

It is noteworthy that the Receive and Transmit Network Protocol Pipeline may just perform a bypass operation from one port to another. Furthermore, a single pipeline could be used and configured to process multiple protocols, for example, Ethernet and Fibre Channel.

Figure 2B:
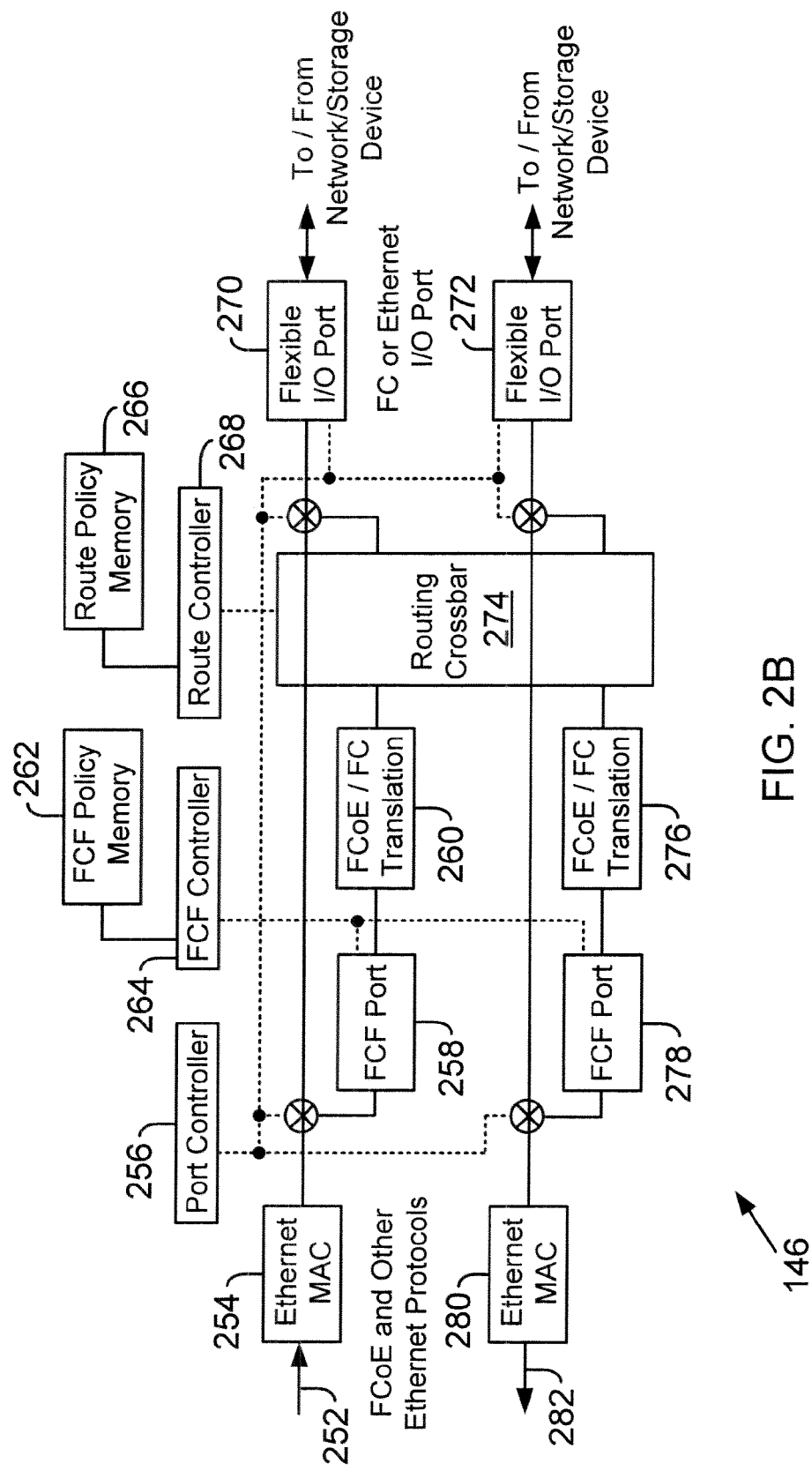
FIG. 2B shows another block diagram of a switch, according to one embodiment.

Gateway 146:

FIG. 2B shows a block diagram of gateway 146, according to one embodiment. Gateway 146 includes Ethernet Media Access Controllers (MACs) 254 and 280, each coupled to Fibre Channel Forwarder (FCF) ports 258 and 278, respectively. Modules 254 and 280 receive frames 252 and 282, respectively. Modules 254/258 and 280/278 may be designated as EXG ports, described below.

FCoE/FC translation modules 260 and 276 perform translation between FCoE and Fibre Channel protocols. Port control module 256 (also referred to as "Port Controller 256) controls the Ethernet MACs 254 and 280, while FCF controller 264 controls the FCF ports 258. The policies for controlling FCF ports are stored in memory 262 (shown as FCF Policy Memory).

Routing crossbar 274 is used for moving frames from FCF ports 258 to flexible I/O ports 270 and 272. The frame routing is controlled by route controller 268 that uses route policy out of route policy memory 266.

Flexible ports 270 and 272 are also configured by port controller 256. Flexible I/O ports 270 and 272 may be configured to operate as Ethernet or Fibre Channel ports for sending and receiving information to network devices as well as storage devices.

In one embodiment, Gateway 146 receives FCoE Ethernet type frames from nodes 142 at Ethernet MAC 254. Gateway 146 strips the Ethernet header and directs the frame to the appropriate Fibre Channel port.

Gateway 146 also receives Fibre Channel frames at one of the flexible I/O ports 270/272. The frame is routed to the appropriate Ethernet/FCF port pair.

Figure 3:
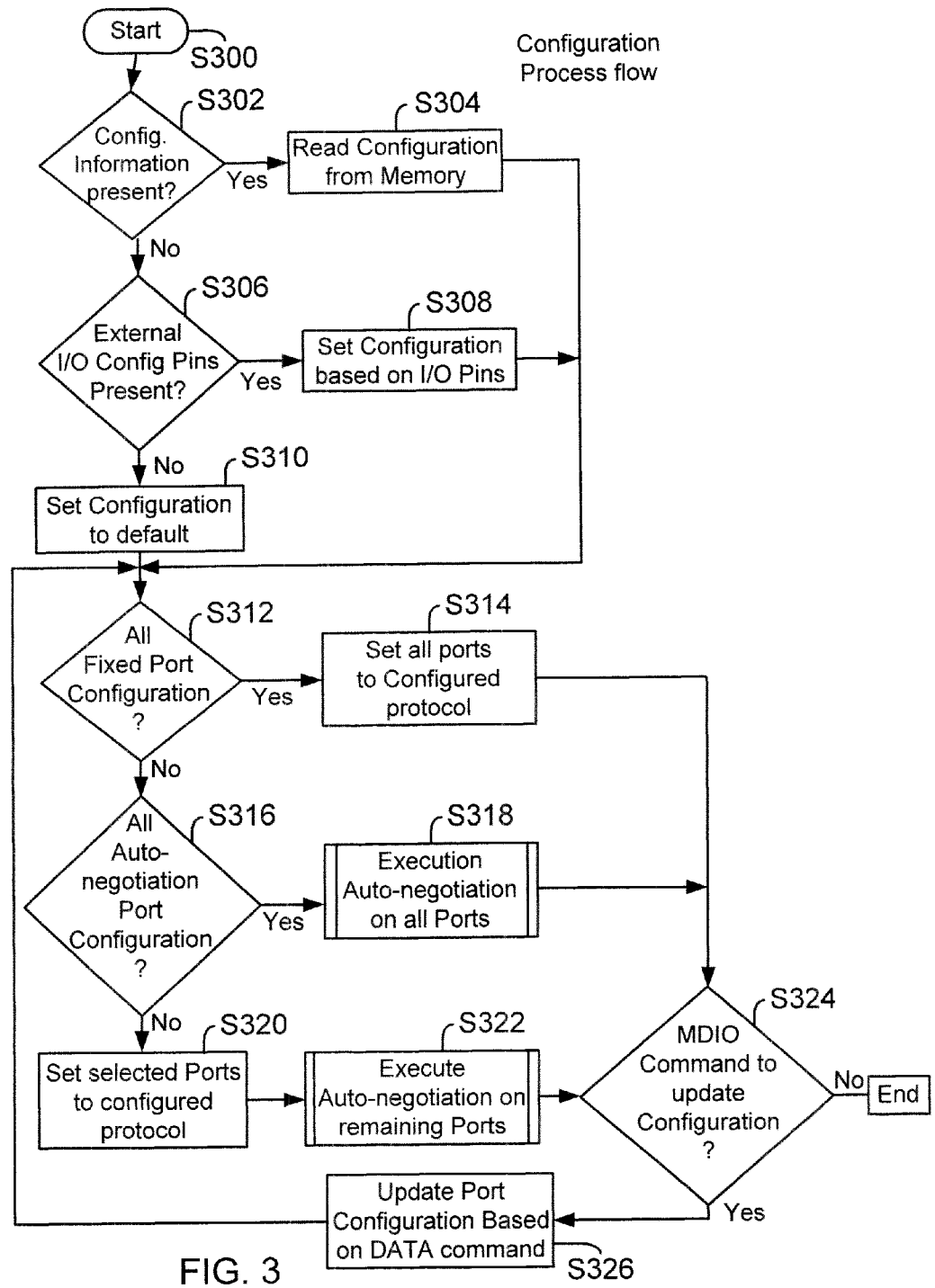
FIGS. 3-6 show process flow diagrams implementing the various embodiments disclosed herein.

Configuration Process Flow Diagrams:

FIG. 3 shows a process flow diagram for configuring switch 110 (or gateway 146) with ports 112, 114, 116 and 118 to operate in more than one mode. The configuration process starts in block S300.

In block S302, switch 110 determines if configuration information 130 is available at memory 125. If configuration information is available, then in block S304, configuration information is read from memory 125 and the process moves to block S312, described below in detail.

If configuration information is not available in memory 125, then in block S306, it is determined if external input/output (I/O) pins (for example, 132, FIG. 1) are present. If I/O pins 132 are present, then the configuration may be received via I/O pins' in block S308.

If Configuration I/O pins are not present, then in block S310, processor 124 may select a default configuration for the port. The default configuration may be defined by firmware code 126 and may be set by the switch 110 manufacturer. The process then moves to block S312.

In block S312, the process determines if all the ports in the switch element 110 have fixed port configuration. This means that each port is dedicated to operate in compliance with a particular protocol. For example, port 116 (FIG. 1) may be configured to operate only as a Fibre Channel port, while port 118 (FIG. 1) may be configured to operate only as an Ethernet port. If fixed port configuration is used, then in block S314 all ports are set to their respective protocol configuration and the process moves to block S324 that is described below.

Referring back to block S312, if the process does not want to use fixed port configuration, then in block S316, the process determines if all ports have "auto-negotiation" ability. During auto-negotiation, communicating ports are able to share operating parameters with each other automatically. If auto-negotiation ability is present, then in block, S318, the auto-negotiation process is executed on all ports as described below and the process moves to block S324.

If auto-negotiation is unavailable for all the ports, then in block S320, each port that does not have the auto-negotiation ability is individually configured to a selected protocol. Thereafter, in block S322, auto-negotiation is performed for ports that have that capability and the process moves to block S324.

In block S324, the process determines if there is an MDIO command to update configuration. MDIO, in this context means Management Data Input/Output, a bus structure defined for the Ethernet protocol. MDIO is defined to connect MAC devices with PHY devices, providing a standardized access method to internal registers of physical devices (also referred to as PHY). These internal registers provide configuration information to the PHY. The MDIO bus allows a user to change configuration information during operation, as well as read the PHY's status.

MDIO is a standards-driven, dedicated-bus approach that's specified by the IEEE 802.3 standard Clause 45. The MDIO interface may be implemented by using two pins, an MDIO pin and a Management Data Clock (MDC) pin. If there is no MDIO command to update configuration information, then the process ends. If a MDIO command is present, then in block S326, port configuration is updated based on the MDIO command.

Figure 4:
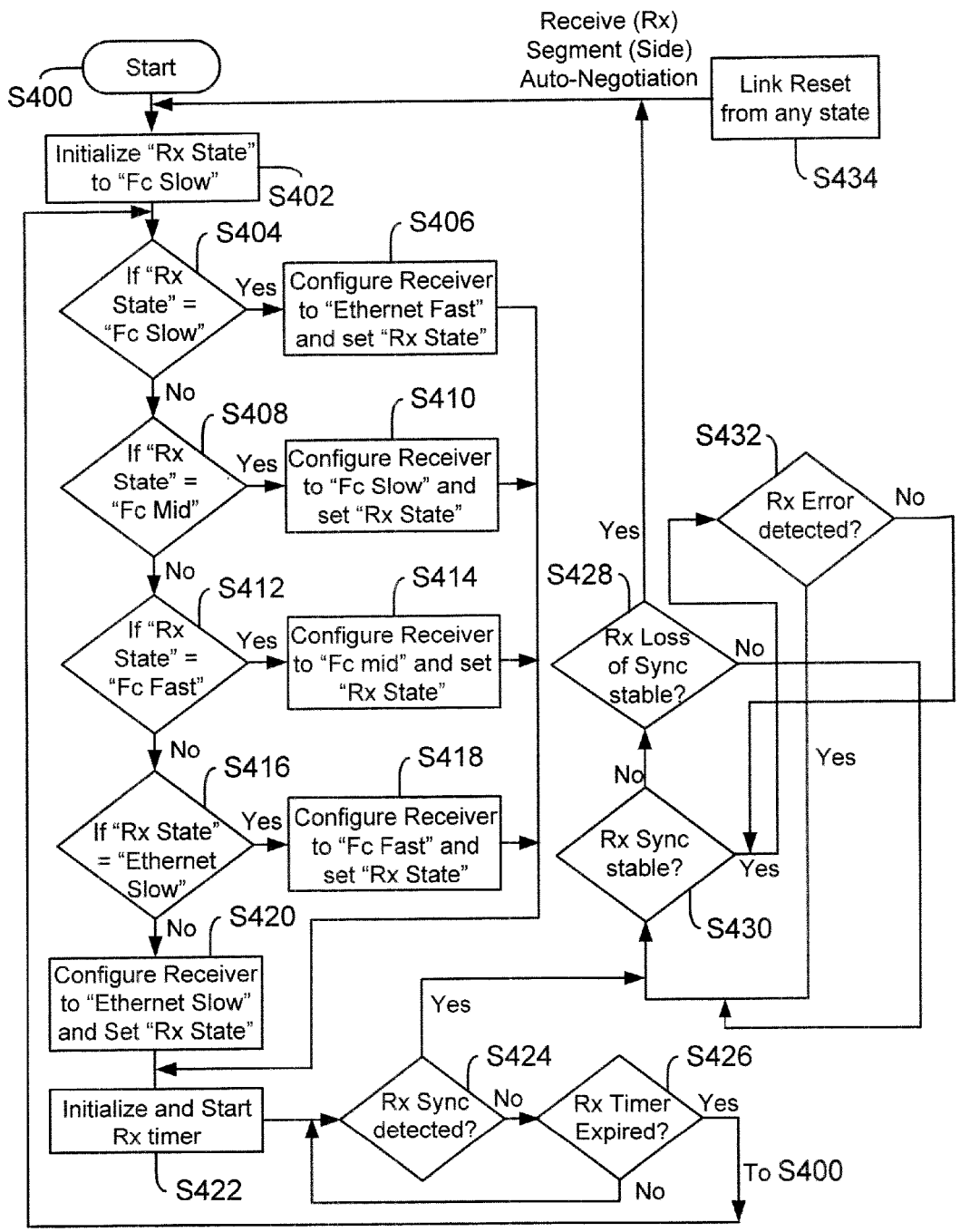

Auto-Negotiation Process Flow Diagrams:

FIG. 4 shows a process flow diagram for auto-negotiation of a receive segment of a port (for example, 112) in a switch element 110, according to one embodiment. The process begins in block S400. In block S402, the "Rx State" is set to "FC Slow". The "Rx State" defines an operating state of a port during which the port operates at a certain link baud rate. A state machine at the receive segment of the port may be used to set the state. The port state machine may define for example; a "slow-level", a "mid-level", or a "fast" operating link baud rate. During the "FC Slow State", a port that is configured to operate as a Fibre Channel port operates at the slowest supported baud rate. For example, if a port can operate at 1 gigabits per second ("G"), 2G, 4G, 8G, 10G, 40G or other higher rates, then the port is initialized at 1G.

After initialization, in block S404, the process determines if the Rx State is set to "FC Slow". If set, then in block S406, the receive segment of port 112 is configured for "Ethernet Fast" and the "Rx State" is set to "Ethernet Fast". The "Ethernet Fast" state in this context means the highest supported Ethernet baud rate. For example, if a port can operate at 1G, 10G, 40G or 100G Ethernet then the port would be initialized at 100G Ethernet. Thereafter, the process moves to block S422, described below. The term "receiver" as shown in FIG. 4 means the receive segment of the port that will receive information.

If the Rx state is not set to "FC Slow" as determined in block S404, then in block S408, the process determines if the Rx State for the port is set to "FC Mid-level". This means that the port operates at a mid-level speed. For example, if the port can operate at 2G, 4G and 8G, then the mid-level setting is at 4G.

If the Rx State is set to a "Mid-level" baud rate, then in block S410, the receive segment is configured for "FC Slow" and the RX State is set to "FC Slow".

If the RX state is not set to "FC Mid-Level", then in block S412, the process determines if the Rx State is set to "FC Fast". If yes, then in block S414, the receive segment is configured for "FC Mid-level" and the Rx State is set to "FC Mid-level".

If the Rx State in block S412 is not set to "FC Fast" then in block S416, the process determines if the Rx State is set to "Ethernet Slow". If yes, then in block S418, the receive segment is configured for "FC Fast" and the Rx State is set to "FC Fast". The process then moves to block S422.

If the RX State in block S416 is not set to "Ethernet Slow" then in block S420, the receive segment is configured for "Ethernet Slow" and the Rx State is set to "Ethernet Slow".

It is noteworthy that more that 3 Fibre Channel link rates and 2 Ethernet link rates could be auto-negotiated. It would also be possible to add other protocols such as Infiniband and Serial Attached SCSI (Small Computer System Interface).

Blocks S404-S420 are part of an auto-negotiation process, where the process toggles through the different protocols and link/baud rates for a port. In one embodiment, a state machine performs the toggling process of checking the different configurable states.

Referring back to FIG. 4, after the receiver port is configured, in block S422, a timer (may be referred to as Rx timer) (not shown) at port 112 is initialized and started. The Rx timer maintains time for a configured state. The timer may be located at port 112 or any other part of switch 110.

In block S424, the process determines if receive side Synchronization (also referred to as "Rx Sync" or "Sync") has been detected. In one embodiment, Synchronization may be defined by an industry standard, for example, Fibre Channel. Synchronization in this context means that port 112 can receive information from another port without any errors.

If Rx Sync is not detected, then in block S426, the process determines if the Rx timer has expired. If the timer has expired, then the process reverts back to block S400. If the timer has not expired, then the process reverts back to block S424.

If in block S424, Rx Sync was detected, then in block S430, the process determines if the Rx Sync is stable. Stable in this context means that Sync is constant without any detected errors for certain duration.

If Sync is stable, then in block S432, the process determines if any error was detected. If yes, then the process moves to block S430. If no error was detected, then the process stays at 5432 until an error or reset is detected.

If in block S430, Rx Sync was detected to be unstable, then in block S428, the process determines if the Rx loss of Sync is stable. If yes, the process moves to block S402 where the auto-negotiation begins again. If no, then the process toggles between S430 and S428.

Figure 5:
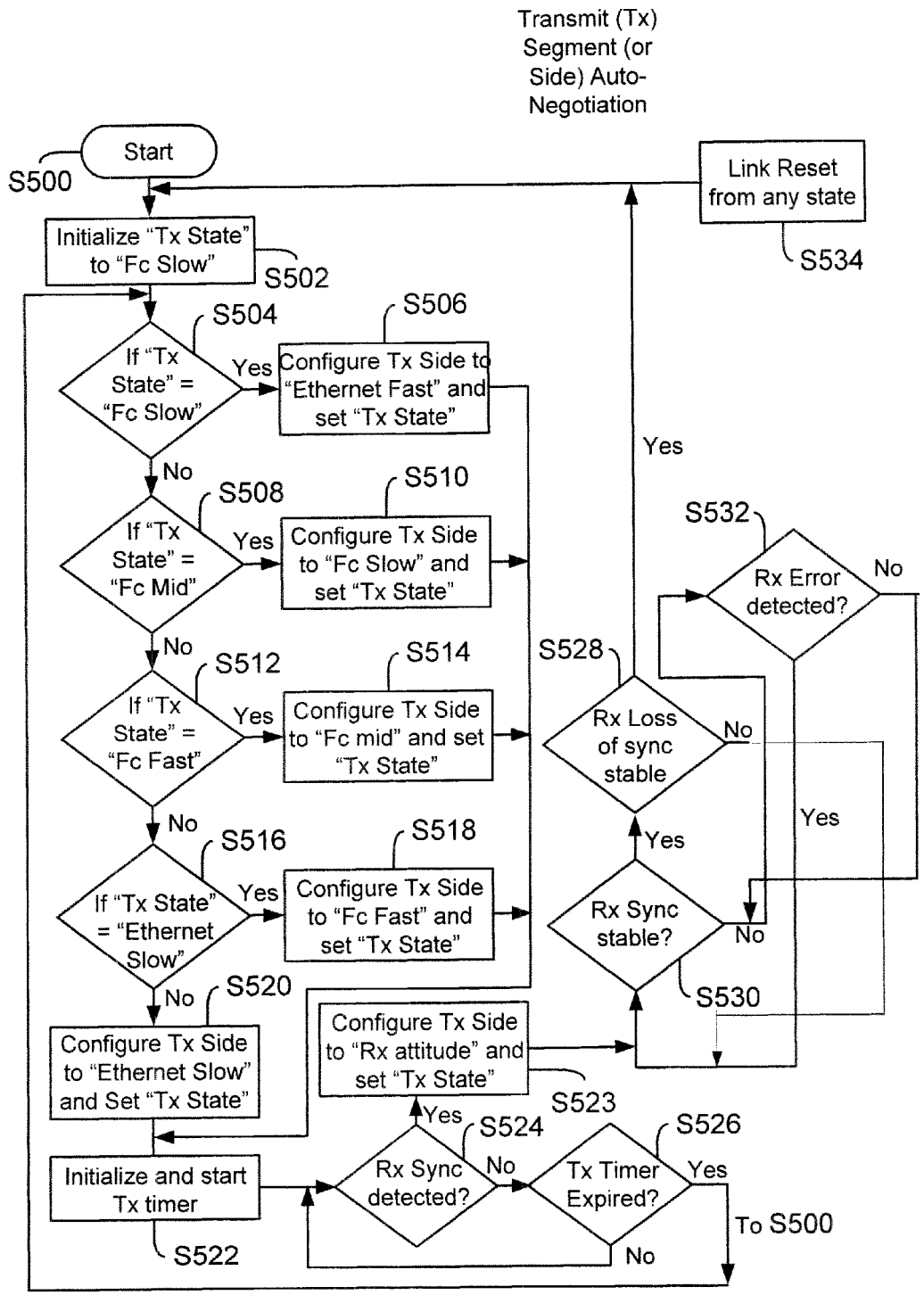

FIG. 5 shows a process flow diagram for auto-negotiation of a transmit segment of a port, according to one embodiment. The process blocks (S500 to 5534) in FIG. 5 are similar to the process blocks of FIG. 4, the only difference being that the flow diagram of FIG. 5 is for a transmit segment, while FIG. 4 is for the receive segment.

Figure 6:
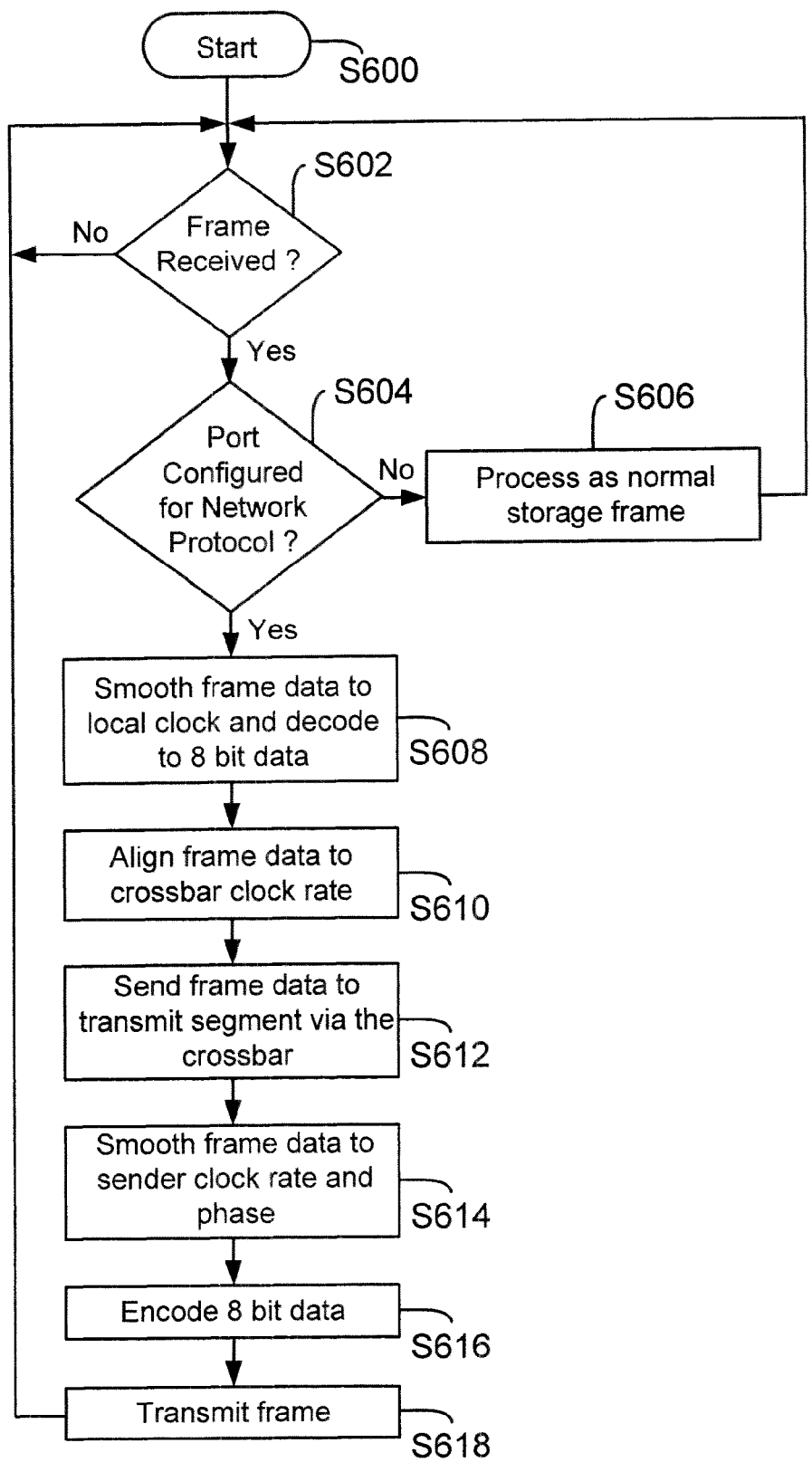

Frame Flow:

FIG. 6 shows a process flow diagram of overall frame flow through a switch 110 port, according to one embodiment. The process begins in block S600. In block S602, it is determined if a frame is received at a receive segment of the port. If the frame is not received, the process waits for the frame. If a frame is received at a receive segment of a port, for example, 112 the process moves to S604.

In block S604, the process determines if the port is configured to operate under a particular network protocol as determined through the configuration process described in FIG. 3, for example, Ethernet.

If the port is not configured for the network protocol (for example, the Ethernet protocol), then in block S606, the frame is processed under a storage protocol, for example, Fibre Channel.

If in block, S604, the port is configured to operate under a network protocol, then in block S608, the frame data is adjusted to a local switch port clock and decoded, for example, to 8-bit data.

In block S610, the frame is aligned to a crossbar clock rate per the Ethernet protocol. Crossbar interface 210 (FIG. 2A) makes this adjustment. In block S612, the frame is sent to the transmit segment. In block S614, the frame is adjusted to the "send" side clock and phase. The adjustment is made by the transmit bypass pipeline 224. The outgoing data is encoded in block S616 and the frame is transmitted to its destination in block S618.

The various embodiments disclosed herein have numerous advantages. For example, it allows users to configure a switch port to operate under more than one protocol. This reduces the number of ports that a user may need to process network and storage traffic and hence makes the switch more cost-effective both for networks and storage systems.

Although the present disclosure has been described with reference to specific embodiments, these embodiments are illustrative only and not limiting. Many other applications and embodiments of the present invention will be apparent in light of this disclosure and the following claims. References throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

What is claimed is:

1. A switching element, comprising:
   a port from among a plurality of ports, which when configured to operate as a network protocol port sends and receives network information and when configured to operate as a storage protocol port sends and receives storage information;
   wherein the port includes:
   a control segment for generating a control signal for setting an operating mode of a serial and de-serializer (SERDES), wherein the operating mode of the SERDES is selected based on whether the port is configured to operate as a network protocol port or as a storage protocol port;
   a storage module at a receive segment of the port for receiving and processing the storage information when the port is configured to operate as a storage protocol port; and
   a network module at the receive segment for receiving and processing the network information, when the port is configured to operate as a network protocol port;
   wherein the port includes a transmit network module having a bypass module for processing network information.

2. The switch element of claim 1, wherein the port is configured to operate as an Ethernet port.

3. The switch element of claim 1, wherein the port is configured to operate as a Fibre Channel port.

4. The switch element of claim 1, wherein the switch element processes information complying with a converged storage and network protocol.

5. The switch element of claim 4, wherein the converged storage and network protocol is Fibre Channel Over Ethernet.

6. The switch element of claim 1, wherein the port is operationally coupled to a network fabric or device.

7. The switch element of claim 1, wherein the port is operationally coupled to a storage fabric or device.

8. The switch element of claim 1 wherein the port is operationally coupled to a computing system via a converged network and storage adapter.

9. The switch element of claim 1 wherein the port includes a transmit segment having a transmit network module for processing network information, when the port is configured to operate as a network protocol port.

10. The switch element of claim 1, wherein the port includes a transmit segment having a transmit storage module for processing storage information, when the port is configured to operate as a storage protocol port.

11. A network system, comprising:
   a computing system interfacing with a converged network adapter (CNA);
   a switch element interfacing with the CNA, a storage system and a network device; the switch element comprising:
   a plurality of ports, where a port from among the plurality of ports when configured to operate as a network port sends and receives network information and when configured to operate as a storage port sends and receives storage information;
   wherein the port includes:
   a control segment for generating a control signal for setting an operating mode of a serial and de-serializer (SERDES), wherein the operating mode of the SERDES is selected based on whether the port is configured to operate as a network protocol port or as a storage protocol port;

a storage module at a receive segment of the port for receiving and processing the storage information when the port is configured to operate as a storage protocol port;

a network module at the receive segment for receiving and processing the network information, when the port is configured to operate as a network protocol port; and a transmit segment having a transmit bypass module for processing network information, when the port is configured to operate as a network protocol port and a transmit storage module for processing storage information, when the port is configured to operate as a storage protocol port.

12. The switch element of claim 11, wherein the port is configured to operate as an Ethernet port.

13. The switch element of claim 11, wherein the port is configured to operate as a Fibre Channel port.

14. The switch element of claim 11, wherein the switch element processes information complying with a converged storage and network protocol.

15. The switch element of claim 14, wherein the converged storage and network protocol is Fibre Channel Over Ethernet.

16. A switch element comprising:

a plurality of ports, where a port from among the plurality of ports when configured to operate as an Ethernet port sends and receives network information and when configured to operate as a Fibre Channel port sends and receives storage information;

wherein the port includes:

a control segment for generating a control signal for setting an operating mode of a serial and de-serializer (SERDES), wherein the operating mode of the SERDES is selected based on whether the port is configured to operate as an Ethernet port or as a Fibre Channel port;

a storage module at a receive segment of the port for receiving and processing the storage information when the port is configured to operate as a Fibre Channel port; and a network module at the receive segment for receiving and processing the network information, when the port is configured to operate as an Ethernet port; and a transmit segment having a transmit network module for processing network information, when the port is configured to operate as an Ethernet port and a transmit storage module for processing storage information, when the port is configured to operate as a Fibre Channel port.

17. The switch element of claim 16, wherein the switch element processes information complying with a converged storage and network protocol.

18. The switch element of claim 17, wherein the converged storage and network protocol is Fibre Channel Over Ethernet.

19. The switch element of claim 16, wherein the port is operationally coupled to a network fabric or device.

20. The switch element of claim 16, wherein the port is operationally coupled to a storage fabric or device.

* * * * *

UNITED STATES PATENT AND TRADEMARK OFFICE
CERTIFICATE OF CORRECTION

PATENT NO.         : 8,391,300 B1
APPLICATION NO.    : 12/539156
DATED              : March 5, 2013
INVENTOR(S)        : Frank R. Dropps et al.

Page 1 of 1

It is certified that error appears in the above-identified patent and that said Letters Patent is hereby corrected as shown below:

In the Specifications:

In column 2, lines 62-64, delete "The specific architecture and operation of the various embodiments will then be described with reference to the general architecture." and insert the same on Col. 2, Line 61, as the continuation of same Paragraph.

In column 4, line 39, delete "Fibre-Channel" and insert -- Fibre Channel --, therefor.

Figure 1C:
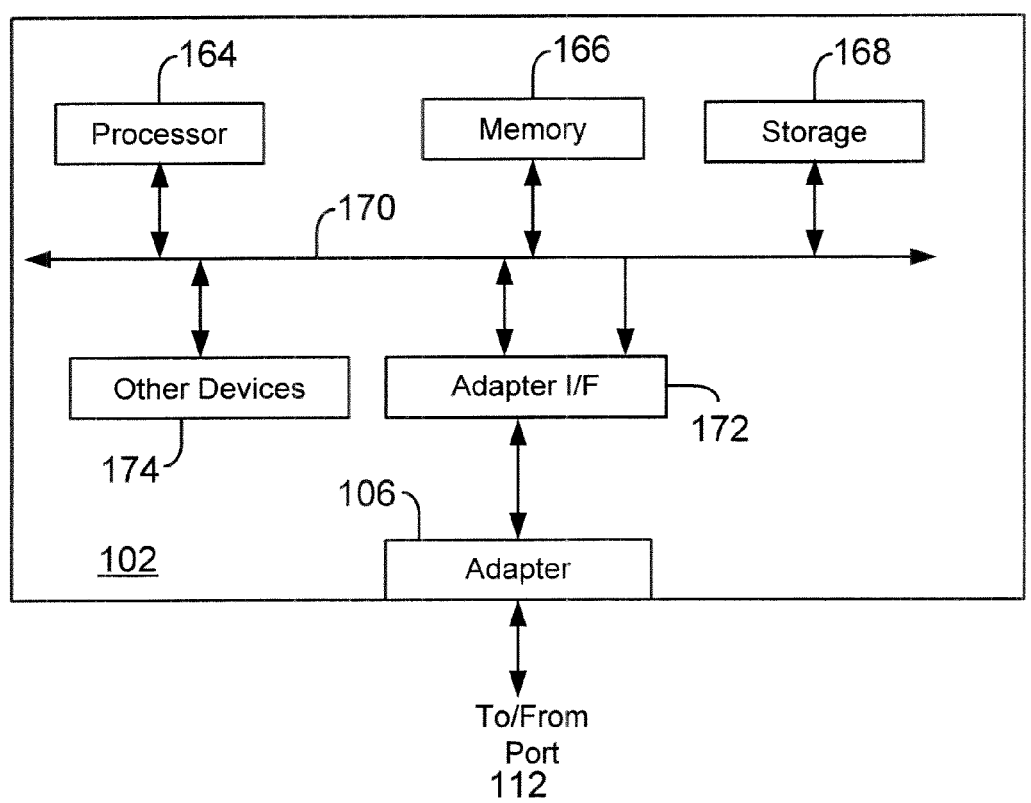
FIG. 1C shows a block diagram of a computing system, used according to one embodiment.

In column 5, line 9, delete "FIG. 10" and insert -- FIG. 1C --, therefor.

In column 5, line 39, delete "(for' example," and insert -- (for example, --, therefor.

In column 7, line 15, delete "pins'" and insert -- pins --, therefor.

In column 9, line 8, delete "5432" and insert -- S432 --, therefor.

In column 9, line 16, delete "5534" and insert -- S534 --, therefor.

In the Claims:

In column 10, line 42, in Claim 8, delete "claim 1" and insert -- claim 1, --, therefor.

In column 10, line 45, in Claim 9, delete "claim 1" and insert -- claim 1, --, therefor.

Signed and Sealed this
Thirteenth Day of August, 2013

Teresa Stanek Rea
*Acting Director of the United States Patent and Trademark Office*